July 10, 1928.   E. J. ADAMS   1,677,011
BABY CARRIAGE
Filed April 14, 1927   2 Sheets-Sheet 1

Inventor
Edwin J. Adams,

By Clarence A. O'Brien
Attorney

July 10, 1928.  1,677,011

E. J. ADAMS

BABY CARRIAGE

Filed April 14, 1927    2 Sheets-Sheet 2

Inventor
Edwin J. Adams,

By Clarence A. O'Brien
Attorney

Patented July 10, 1928.

1,677,011

UNITED STATES PATENT OFFICE.

EDWIN J. ADAMS, OF LITTLE FALLS, NEW YORK.

BABY CARRIAGE.

Application filed April 14, 1927. Serial No. 183,758.

This invention relates to new and useful improvements in baby carriages and aims to provide a combined wheel and runner supporting structure for the carriage body for facilitating the rolling of the carriage on dry surfaces and the pushing of the same over the snow with the end in view that the same may be used under various weather conditions.

In carrying out the present invention there is provided a pair of transverse axles having wheel supporting tanks at the ends thereof upon which are conventional wheels, the axles being mounted for rotation and means being provided for rotating the axles in unison to permit the raising and lowering of the wheel with respect to the carriage body, a pair of spaced longitudinal runners being provided for supporting the carriage when the wheels are raised.

One of the most important objects of this invention is to provide wheel and runner supporting structure for a baby carriage that consists of but relatively few parts and these so corelated as to reduce the possibility of disarrangement to a minimum, said structure being further of such a character as to permit of the rapid and easy raising or lowering of the wheels with respect to the carriage body.

In the drawings wherein like numerals indicate corresponding parts throughout the several views.

Figure 4:
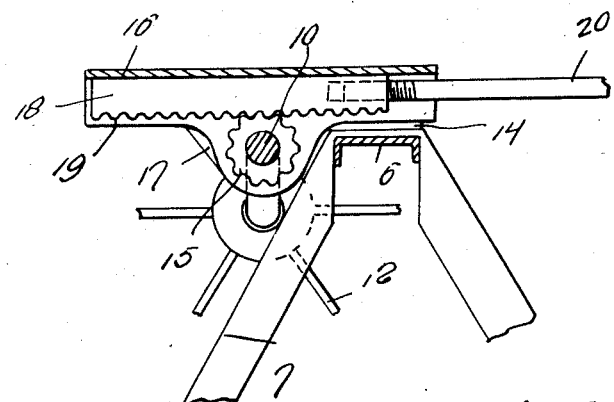
Figure 2:
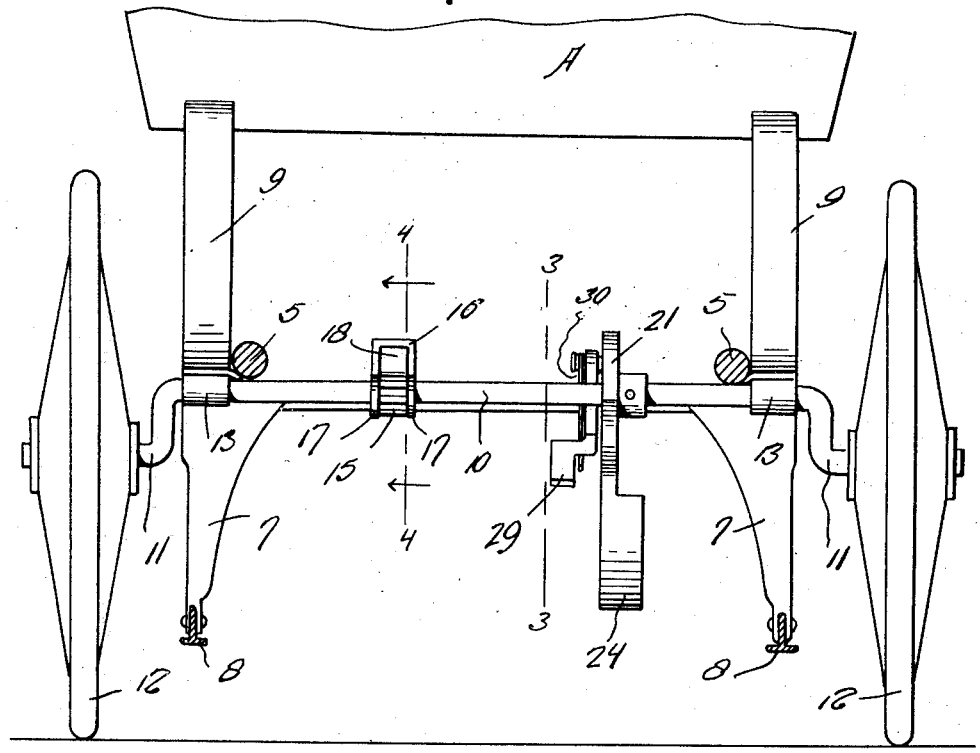
Figure 2 is a view partially in rear elevation and partially in vertical cross section taken at a point directly in back of the rear axle.
Figure 3:
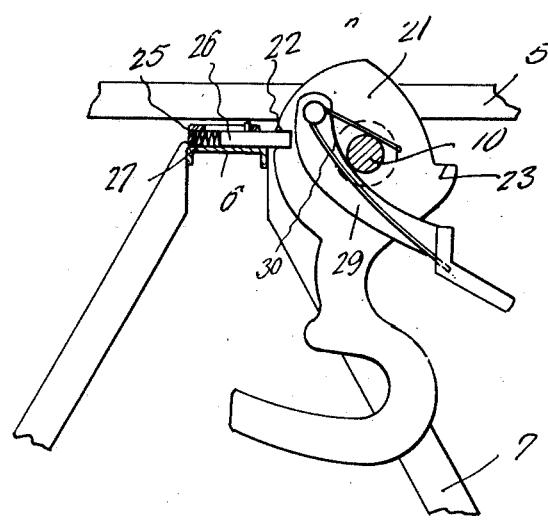

Figure 4 is a fragmentary section taken substantially upon the line 4—4 of Figure 2 for more clearly disclosing the operating mechanism for the adjacent wheel supporting axle, a similar mechanism being provided for facilitating the opertion of each of the axles, and Figure 3 is an enlarged view taken substantially upon the line 3—3 of Figure 2 for more clearly disclosing the foot operated axle control mechanism together with the means for locking the same in position to maintain the wheels in carriage supporting position.

Figure 1:
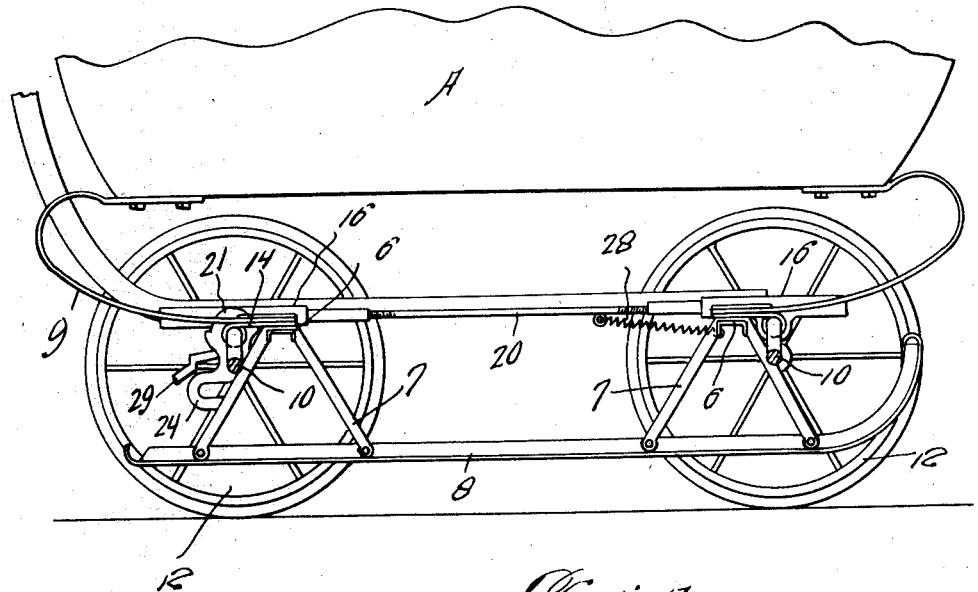
Figure 1 is a longitudinal section through the center of the carriage, the body thereof being fragmentarily disclosed in side elevation.

Now having particular reference to the drawing, my novel carriage consists of the usual transversely spaced longitudinally extending frame bars 5—5, the rear ends of which are curved upwardly as indicated in Figure 1 so as to provide the pushing handle for the carriage. Arranged transversely between the bars 5—5 at the front and rear thereof are channel bars 6—6. Secured to these channel bars by reason of hangers 7—7 are longitudinally extending spaced parallel sleigh runners 8—8.

Any desirable type of body A is arranged in position above the bars 5—5 and supported upon the transverse channel bars 6—6 by four similarly constructed leaf springs 9, preferably of the curved formation as disclosed in Figure 1, the upper ends thereof being bolted to the bottom of the body A, while the lower ends are riveted, welded, or otherwise suitably secured to the surfaces of the channel bars 6—6.

Arranged in spaced relation with the outer sides of the channel bars 6—6 are transversely extending axles 10—10 of circular shape in cross section, the ends thereof being cranked as at 11—11 and upon which cranked portions are arranged wheels 12—12. These axles are mounted for rotation within spaced bearing sleeves 13—13 formed upon the outer ends of metallic plates 14 rigidly secured between the inner ends of the springs 9 and the channel bars 6.

At a point slightly off center each axle 11 has keyed thereto a toothed gear 15, while arranged longitudinally above each gear is a longitudinal guide tube 16 open at its opposite ends and at its bottom side, the lower edges of the side walls thereof intermediate the ends of each tube being formed with depending ears 17—17 having registering openings therein through which the respective axle 10 passes. Slidably mounted within each guide tube 16 is a rack bar 18 having teeth 19 upon the lower surface thereof for meshing with the respective gears 15 of the axles 10—10. These rack bars 18 are interconnected by a longitudinally extending rod 20 so as to cause the simultaneous movement thereof.

Keyed to the rearmost axle 10 in an eccentric manner is a cam plate 21, the periphery of which is formed at one side of the axle 10 with a notch 22 and at the opposite side of said axle with a stop lug 23. Formed integrally with the periphery of the cam between the notch 22 and lug 23 is a foot engaging lever 24. Arranged upon the channel bar 6 directly adjacent the cam 21 is a latch pin housing 25 within which is mounted a latch pin 26, the outer end of which is normally projected through an opening at the end of the housing adjacent said cam 21 by an expansible coil spring 27, this latch mechanism as well as the cam being more clearly disclosed in Figure 3. Obviously when the foot lever 24 is depressed into the position disclosed in Figures 1, 2 and 3, the axles 10—10 have been rotated to cause the wheels 12 to engage the road surface for supporting the carriage. Furthermore, the cam will be locked in this position by reason of the latch pin 26 engaging within the cam notch 22. By throwing the lever in a reverse direction after the latch pin 26 has been released from the notch 22 the axles will be reversely rotated for raising the wheels so that the carriage will be supported by the runners 8—8. The upward swinging movement of the wheels is occasioned by reason of a relatively strong retractile coil spring 28 connected at one end to the rod 20 adjacent its forward end and at its opposite end to the foremost channel bar 6.

For facilitating the releasing of the latch pin 26 from the cam notch 22, there is pivoted to one side of the cam a lever 29, the opposite end of which extends outwardly of the axle 10 when the cam has been moved to the position disclosed in Figure 3. This lever 29 is normally maintained out of engagement with the pin 26 by reason of a wire spring 30 attached to the lever and to the cam preferably as indicated in Figure 3. Obviously by depressing the free end of this lever 29 with the foot, the inner end thereof will be swung into engagement with the pin 26 causing the rearward movement of the same against the action of the spring 27.

It will thus be seen that I have provided a highly novel, simple, and useful wheel and runner support for carriages that is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim is:—

1. In a carriage of the character described, a pair of transverse frame bars for supporting a carriage body, a pair of cross axles journaled to the frame bars to permit the rotation thereof, cranks on the ends of the axles, supporting wheels rotatable on the cranks, gears fixed on the axles, rack bars meshing with the gears, means interconnecting the rack bars to cause the simultaneous movement thereof, a lever on one of the axles for turning the same to cause the simultaneous turning of all of the axles through the gears and rack bars for raising and lowering the wheels in respect to the carriage body, means for normally maintaining the wheels in a lowered position, a pair of sleigh runners suspended from the cross bars for supporting the carriage when the wheels are raised, means engageable with the lever for maintaining it in wheel raised position, and additional manual controlled means for releasing said third mentioned means to permit the reverse turning of the axles to swing the wheels downwardly beyond the runners for supporting the carriage.

2. In a carriage of the character described, a pair of transverse frame bars for supporting a carriage body, a pair of cross axles journaled to the frame bars to permit the rotation thereof, cranks at the ends of the axles, supporting wheels rotatably mounted on the cranks, gears fixed on the axles, rack bars meshing with the gears, means interconnecting the rack bars to cause the simultaneous movement thereof, a lever on one of the axles for turning the same to cause simultaneous turning of all of the axles through the intermediacy of the gears and rack bars, thereby raising or lowering the wheels, means for normally maintaining the wheels in lowered position, a pair of sleigh runners suspended from the cross bars for supporting the carriage when the wheels are raised, a spring pressed latch engaging a notch in a portion of the lever for maintaining said lever in wheel raised position, and additional manual control means for releasing said latch to permit the reverse turning of the axle to swing the wheels downwardly beyond the runners for supporting the carriage.

3. In a carriage of the character described, a frame for supporting a carriage body, a pair of cross axles journaled to the frame to permit the rotation thereof, cranks on the ends of the axles, supporting wheels rotatable on the cranks, gears fixed to the axles, a rack bar meshing with the gears, a lever on one of the axles for turning the same to simultaneously turn the other axles through the gears and rack bar for raising the wheels, means for normally maintaining the wheels in lowered position, a pair of sleigh runners suspended from the frame for supporting the carriage when the wheels are raised, means engageable with the lever for maintaining it in wheel raised position, and additional manual control means for releasing the last mentioned means to permit the reverse turning of the axles to swing the wheels downwardly beyond the runners for supporting the carriage.

4. In a carriage of the character described, a frame for supporting a carriage body, a pair of cross axles journaled to the frame to permit the rotation thereof, cranks on the ends of the axles, supporting wheels rotatable on the cranks, gears fixed to the axles, a rack bar meshing with the gears, a lever on one of the axles for turning the same to cause simultaneous turning of the other axle through the gears and the rack bar for raising the wheels, said lever having a notch in a portion thereof, a latch structure on the frame for engaging the notch so as to maintain the lever in wheel raised position, additional means for releasing said latch to permit the reverse turning of the axles to swing the wheels downwardly beyond the runners for supporting the carriage, and means for normally maintaining the wheels in lowered position.

In testimony whereof I affix my signature.

EDWIN J. ADAMS.